United States Patent [19]

Diez et al.

[11] Patent Number: 5,466,393
[45] Date of Patent: * Nov. 14, 1995

[54] FOAMING AGENT

[75] Inventors: Ricardo Diez, Burlington; John Pidnebesny, Hope Township; Susanna Ng, Brampton, all of Canada

[73] Assignee: Stepan Company, Northfield, Ill.

[*] Notice: The portion of the term of this patent subsequent to Aug. 31, 2010, has been disclaimed.

[21] Appl. No.: 111,202

[22] Filed: Aug. 24, 1993

Related U.S. Application Data

[63] Continuation-in-part of Ser. No. 643,228, Jan. 22, 1991, Pat. No. 5,240,639, which is a continuation-in-part of Ser. No. 333,078, Apr. 4, 1989, abandoned, which is a continuation-in-part of Ser. No. 179,842, Apr. 11, 1988, abandoned.

[30] Foreign Application Priority Data

Apr. 7, 1988 [CA] Canada .................................. 563517

[51] Int. Cl.$^6$ .......................... B01F 17/02; C04B 11/024; C04B 24/16
[52] U.S. Cl. ............................ 252/307; 252/353; 156/39; 106/680
[58] Field of Search .................................. 252/307, 353; 156/39; 106/680

[56] References Cited

U.S. PATENT DOCUMENTS

| | | | |
|---|---|---|---|
| 3,782,983 | 1/1974 | Komor | 106/88 |
| 3,912,528 | 10/1975 | Doan et al. | 156/39 |
| 4,046,582 | 9/1977 | Kawamura et al. | 106/88 |
| 4,156,615 | 5/1979 | Cukier | 159/39 X |
| 4,618,370 | 10/1986 | Green et al. | 159/39 X |
| 4,676,835 | 6/1987 | Green et al. | 252/308 |
| 4,678,515 | 7/1987 | Green et al. | 159/39 X |
| 5,158,612 | 10/1992 | Savoly et al. | 252/308 |
| 5,240,639 | 8/1993 | Diez et al. | 252/307 |

FOREIGN PATENT DOCUMENTS

| 1085880 | 9/1980 | Canada. |
|---|---|---|
| 0204360 | 10/1988 | European Pat. Off.. |

Primary Examiner—Richard D. Lovering
Assistant Examiner—Daniel S. Metzmaier
Attorney, Agent, or Firm—Banner & Allegretti, Ltd.

[57] ABSTRACT

A foaming agent having improved foaming performance comprised of a mixture of alkyl sulfates and alkyl ether sulfates which have the general formula: $R\,(CH_2CH_2O)_y$—$SO_3M$ (I) wherein R is a linear and/or branched hydrocarbon moiety having a maximum molecular weight of about 169, y is an integer, representing the number of moles of ethylene oxide per mole of R and, on a percent by weight distribution of the oxyethylene oligomers, the alkyl sulfate oligomer is from about 25 to 85 percent by weight of the total oligomeric distribution, and the sum of the alkyl sulfate, alkyl mono-ether sulfate, alkyl di-ether sulfate, alkyl tri-ether sulfate, alkyl tetra-ether sulfate, and alkyl penta-ether sulfate oligomers is from about 80 to 96 percent by weight of the total oligomeric distribution; M is a cation capable of producing a water-soluble surfactant; said hydrocarbon moiety being comprised of at least about 80 percent by weight of a first anionic active species, represented by R, having a molecular weight ranging from about 100 to 156, and up to about 20 percent by weight of a second anionic active species, represented by R, having a molecular weight of up to about 86, and up to about 10 percent by weight of a third anionic active species, represented by R, having a molecular weight of about 170 or greater. A method of using this foaming agent in the making of gypsum products and the resulting gypsum products is also disclosed. The foaming agent may also be used for other purposes, for instance, as a fire fighting foam.

20 Claims, No Drawings

FOAMING AGENT

RELATED APPLICATION DATA

This invention is a continuation in part of application Ser. No. 07/643,228, filed Jan. 22, 1991, now U.S. Pat. No. 5,240,639, which is a continuation-in-part of application Ser. No. 07/333,078 filed Apr. 04, 1989, now abandoned, of which in turn is a continuation-in-part of Ser. No. 07/179,842 filed Apr. 11, 1988, now abandoned, claiming priority from Canadian Serial No. 563,517 filed Apr. 07, 1988.

FIELD OF THE INVENTION

The invention relates to an improved foaming agent having an improved capacity for producing foam. More particularly, the invention is directed to improved foaming agents useful in the process of making gypsum products, to the products so made, and to other end uses, for instance, as fire fighting foams and air-entraining agents for concrete.

The invention also relates to a foaming agent mixture that is readily soluble in cold water and has a flash point that exceeds 200° F.

BACKGROUND OF THE INVENTION

In the manufacture of gypsum board, it is common practice to incorporate air bubbles into gypsum slurries by the addition of foaming agents. The benefits of entraining air bubbles into the gypsum slurries include:

(a) reduced amount of water needed to render the gypsum slurry adequately fluid thereby minimizing the energy needed to drive off any excess water;

(b) reduced density of the hardened gypsum products; and (c) reduce cost of gypsum board.

Gypsum is mainly composed of calcium sulphate. Foaming agents, and particularly alkyl sulfates and alkyl ether sulfates are sensitive to calcium ions. And, in the actual manufacture of gypsum board, the foaming agent is exposed to a constant flow of calcium ions. Thus, it is important for the foaming agent which is to be used in the manufacture of gypsum board to be able to produce copious amounts of foam in saturated calcium sulfate solutions where the presence of solid gypsum particles are predominant.

Therefore, it is important to test gypsum foaming agents in an environment which is as close as possible to that which such agents will encounter in the actual manufacturing of gypsum wallboard. The method of evaluation used in this invention is one in which the performance of the foaming agents is determined by their ability to entrain air into gypsum slurries. As will be illustrated, the foaming agents disclosed herein show substantial enhanced performance, as measured by their ability to entrain air into gypsum slurries, than foaming agents disclosed in the prior art.

Cukier, U.S. Pat. 4,156,615 issued May 29, 1979 (now assigned to Stepan Canada, Inc., assignee of the present invention) discloses a salt of an ethoxylated and sulfated primary linear alcohol. This alkyl ether sulfate has a general formula $CH_3(CH_2)_xCH_2(OCH_2CH_2)_4OSO_3M$ wherein the average value of x can range from 8.5 to 9.5 with molecular weights ranging from 121 to 135 and the values of x lying in the range of 8 to 10 (molecular weights lying in the range of 114 to 143) constitute at least 90 percent by weight of the active ingredient. The average value of y lies from 1.5 to 2.5, and M represents either sodium or ammonium ions. Cukier's preferred average value of x is 9 (molecular weight of 128) and the preferred average value of y is 2.2. This alkyl ether sulfate will hereinafter sometimes be referred to as Cukier, Sample A.

Green et al., U.S. Pat. No. 4,678,515 issued Jul. 07, 1987 (now assigned to Stepan Company) discloses foaming agents with improved foaming properties, comprised of a mixture of about 89 to 67 percent by weight of an alkyl ether sulfate of the type disclosed by earlier referenced Cukier, U.S. Patent '615, with about 11 percent to 33 percent by weight of a second alkyl ether sulfate with the Cukier general formula, wherein x ranges from 12 to 14 (molecular weights ranging from 179 to 199) and the average value of y ranges from 1 to 3. The teachings of Green et al. result in mixtures of alkyl ether sulfates having average values of x lying in the range from 9.4 to 10.4, (molecular weights ranging from 134 to 148) and average values of y ranging from 2.0 to 3.5. As previously discussed, the method of evaluating foaming agents is of substantial importance. In Green et al., U.S. Patent '515, performance was measured on the basis of the foam generated and the foam stability produced by a surfactant in an environment consisting of a saturated gypsum solution from which solid particles of gypsum had been removed. This is different from the environment which is present in the actual manufacture of gypsum board. The determining factor in the performance of a foaming agent is the ability of that foaming agent to be able to foam and entrain air in a gypsum slurry where a saturated solution of calcium sulfate, as well as solid gypsum particles, are always present. In an environment where there is a fixed amount of calcium ions, and no solid gypsum to replace those ions which may react with the foaming agent, there exists an excessive amount of foaming agent in such system, (the environment used by Green et al., U.S. Patent '515), and potential for inaccurate results may be present.

A more accurate test for determining the performance characteristics of a foaming agent is one which determines the ability of such agent to entrain air into a gypsum slurry while emulating conditions encountered in actual manufacture of gypsum products. Such a test, designated hereinafter as the Gypsum Block Test, was developed during attainment of this invention and results therefrom show that the foaming agents disclosed by this invention have a greater capacity to entrain air into a gypsum slurry than the surfactants disclosed by the earlier referenced Cukier, U.S. Patent '615, and/or Green et al., U.S. Patent '515.

It should also be noted that neither prior art teaching is concerned with the oxyethylene distribution. In accordance with the principals of the invention, while the molecular weight of R must be from about 169 to 91, changes within those parameters do not greatly affect the performance of the foaming agent. However, the oxyethylene distribution is a very important criteria. Changes in distribution greatly affect the performance of the foaming agent, even when the average value of y remains constant.

An important property of foaming agents especially in the manufacture of gypsum wallboard is their ability to be completely and rapidly dissolved in water, before they are generated into a foam to be incorporated into the gypsum slurry. Failure to completely and rapidly dissolve will result in gel-like particles being carried into the gypsum slurry. The processes of wallboard manufacture can be pictured as the creation of a "sandwich" of gypsum between paper covers. When gel particles are contained in the slurry and the slurry is subsequently dried to remove water in the setting of the gypsum, the gel particles result in voids where the gypsum filed to fill the locations. At the paper surface such a voids can even result in rupture of the paper. Gypsum wallboard with large voids is unacceptable.

Typically, manufacturers of gypsum wallboard purchase foaming agents in bulk quantities rather than drums an store such product in tanks for considerable and extended periods of time. Typical carriers or solubilizers such as low molecular weight alcohols such as methanol, ethanol and isopropanol in foaming agents present problems related to their relatively high vapor pressures. The high vapor pressures of these alcohols usually results in loss or evaporation of the carrier during storage. The foaming agent then very often exhibits poor solubility in water and can result in the preparation of a gypsum wallboard product that has voids and is, therefore, unacceptable. Moreover, because of their low vapor pressure and high flammability, special requirements and precautions including labeling must be observed which contribute to increased costs.

SUMMARY OF THE INVENTION

The invention provides a foaming agent having improved performance comprised of a mixture of anionic active oligomers of alkyl sulfates and alkyl ether sulfates which have the general formula R $(OCH_2CH_2)_4$—$SO_3M$ (I) wherein R is a linear and/or branched hydrocarbon moiety having a maximum molecular weight of about 169, y is an integer, representing the number of moles of ethylene oxide per mole of R and, on a percent by weight distribution of the oxyethylene oligomers, the alkyl sulfate oligomer is from about 25 to 85 percent by weight of the total oligomeric distribution, and the sum of the alkyl sulfate, alkyl mono-ether sulfate, alkyl di-ether sulfate, alkyl tri-ether sulfate, alkyl tetra-ether sulfate, and alkyl penta-ether sulfate oligomers is from about 80 to 96 percent by weight of the total oligomeric distribution; M is a cation capable of producing a water-soluble surfactant; said hydrocarbon moiety being comprised of at least about 80 percent by weight of a first anionic active species, represented by R, having a molecular weight ranging from about 100 to 156, and up to about 20 percent by weight of a second anionic active species, represented by R, having a molecular weight of up to about 86, and up to about 10 percent by weight of a third anionic active species, represented by R, having a molecular weight of about 170 or greater.

The invention is also directed to an improved method of making gypsum board using the compositions described above, with the improvement comprising mixing gypsum with a relatively small amount of such anionic active foaming agent.

The invention is also directed to a new gypsum product containing the residual foaming agent as defined above.

The invention further provides foaming agents that comprise mixtures of anionic surfactant in a low vapor pressure carrier or solubilizer. The low vapor pressure carriers or solubilizers are selected from various alkylene glycol species, i.e., alkylene glycols, alkylene glycol ethers and polyalkylene glycol ethers. Such foaming agents are more safe to handle and store due to the flash points of the compositions which are typically greater than about 200° F. The low vapor pressure of the glycol and glycol ether carriers minimizes carrier evaporation resulting in substantially reduced emission of volatile organic compounds (VOC) to the environment. The reduced evaporation of the glycol or glycol ether carrier provides a foaming agent that may be stored for an extended period of time without any decrease in the ability of the foaming agent to be rapidly and completely dissolved in water. This avoids the presence of gel particles in a gypsum slurry and the resulting voids in the final gypsum product.

PREFERRED EMBODIMENTS OF THE INVENTION

A preferred method of practicing this invention consists of blending a specific alcohol sulfate with a specific alcohol ether sulfate to achieve the desired molecular weight and oxyethylene distribution previously disclosed. For example, when an octyldecyl alcohol sulfate (R is from 8 to 10, molecular weight of R is from about 114 to 142), which alone is a relatively poor gypsum air entrainer, is mixed in such a proportion with a foaming agent of the type disclosed by Cukier (U.S. Patent '615, Sample A), to achieve a distribution of oxyethylene oligomers where the alkyl sulfate oligomer is from about 25 to 85 percent by weight of the total oligomeric distribution, and the sum of the alkyl sulfate, alkyl mono-ether sulfate, alkyl-di-ether sulfate, alkyl tri-ether sulfate, alkyl tetra-ether sulfate, and alkyl penta-ether sulfate oligomers is from about 80 to 96 percent by weight of the total oligomeric distribution, the resulting foamer has a greater capacity to entrain air into a gypsum slurry than a foamer of the type disclosed by Cukier U.S. Patent '615. The addition of a foaming agent which is a relatively poor gypsum air entrainer (octyl-decyl alcohol sulfate) to a foaming agent which is a relatively good gypsum air entrainer (the type disclosed by Cukier, U.S. Patent '615) yields new foaming agents within the scope of this invention. These new foaming agents are superior gypsum foamers.

The foaming agents of the invention are preferably diluted with a carrier wherein the foaming agent is the major constituent, i.e. at least fifty percent by weight. Typical carriers include water, alcohol moieties, glycols and glycol ethers. In certain embodiments, alcohols having a low molecular weight, such as methanol, ethanol, and propanol, are used in combination with water.

The carrier or solubilizer for the mixture of anionic surfactants may be an alkylene glycol having from 2–8 carbon atoms in a straight or branched chain. The glycol may be a monomeric glycol or a polyalkylene glycol such as diethylene glycol or dipropylene glycol. In preferred glycols and glycol ethers, the hydroxy groups form vicinal diols.

The carrier may also be an alkylene glycol ether or a polyalkylene glycol ether where each alkylene portion has from 2–8 alkyl carbon atoms in a straight or branched chain and the ether alkyl portion is a straight or branched chain lower alkyl having 1–6 carbon atoms. The glycol ethers may be mono- or diethers of the alkylene glycol and the alkylene glycol may be monomeric or polymeric.

In preferred embodiments of the invention, the mixture of surfactants is present in the foaming agent glycol or glycol ether composition at a total surfactant (active) concentration of about 35–80% by weight and the glycol or glycol ether concentration is about 25–65% by weight. The glycol and glycol ether based compositions may be dissolved in water, brine or saturated-gypsum water at concentrations of from about 0.1% to about 5% by weight.

The glycols of the invention include, for example, ethylene glycol, propylene glycol, hexylene glycol, diethylene glycol, triethylene glycol and dipropylene glycol. The ethers of the alkylene glycols include, for example, diethylene glycol monobutyl ether, propylene glycol monomethyl ether, dipropylene glycol monomethyl ether, tripropylene glycol monomethyl ether, propylene glycol methyl ether acetate, dipropylene glycol methyl ether acetate, ethylene glycol monobutyl ether, diethylene glycol monobutyl ether, triethylene glycol monobutyl ether, diethylene glycol monoethyl ether, propylene glycol tertiary butyl ether, propylene glycol monobutyl ether and dipropylene glycol monobutyl ether.

Foaming agents prepared by dissolving the mixture of surfactants in an alkylene glycol or alkylene glycol ethers have low vapor pressures. Since they have low vapor pressures, the carriers in these foaming agents do not evaporate and the foaming agent has an extended usable life during storage.

The foaming agent is neutralized with a base such as $NH_4OH$ to produce a water soluble surfactant. Typical samples of cations producing a water soluble surfactant include sodium, potassium, magnesium, ammonium, and organic derivatives thereof, such as triethanolamine and the like. Presently preferred cations are ammonium and the organic derivatives thereof.

The foaming agents of this invention are particularly useful in producing gypsum board and are typically used in amounts ranging from about 0.03 to 0.01 parts by weight per 100 by weight of gypsum.

The novel products of this invention contain a greater percent, by weight, of air which is entrained in a gypsum product. The gypsum products which are made with the inventive foaming agent have lower densities than products which are made with foaming agents disclosed in the prior art.

The foaming agent in this invention may also be used for other foaming applications, for example, firefighting foams.

OTHER EMBODIMENTS OF THE INVENTION

There are other ways of practicing the principals of the invention, such as blending fatty alcohols with ethoxylated fatty alcohols, followed by sulfation of the blend with a sulfating agent such as $SO_3$, and then neutralization with a base, such as $NH_4OH$. There is also the direct method of practicing the principals of the invention, wherein about one mole of a linear and/or branched alcohol having at least 80 percent by weight, most preferably 98 percent by weight of 8 to 10 carbon atoms (were the molecular weight of R is from about 114 to 143) is reacted with about 0.4 to 1.3 moles, and most preferably 0.8 moles of ethylene oxide in the presence of a catalyst to incorporate the oxyethylene groups. Typical examples of such catalysts include NaOH and KOH. Once the oxyethylene groups are incorporated, the ethoxylated fatty alcohols are then conventionally sulfated with a base such as $SO_3$, and then conventionally neutralized with a base such as $NH_4OH$, to obtain directly the inventive foaming agent.

The following examples are non-limiting embodiments of the invention and are included merely as specific exemplary embodiments of the invention.

EXAMPLES I TO IV

All the foaming agents that were tested had the general molecular formula (I) so that they can be identified in Table 1 merely by the values of R and y, and the identity of the cation M is ammonium unless otherwise specified.

The Example I foaming agent was prepared by blending 75 percent by weight of a linear alcohol containing at least 98 percent by weight of 8 to 10 carbons (i.e., R is from 8 to 10, molecular weight is about 131, this alcohol will herein be referred to as Sample F-1) with 25 percent by weight of the unsulfated ethoxylate of Sample A (the material disclosed by Cukier, U.S. Patent '615, herein referred to as Sample A-1), and then conventionally sulfating and neutralizing the blended materials to give a final composition with a molecular weight of R at about 131, and an average y value of 0.4.

The Example II foaming agent, was prepared by blending 50 percent by weight of Sample A-1 (identified above) with 50 percent by weight of Sample F-1 (identified above) and then conventionally sulfating and neutralizing the blended materials to give a final composition with a molecular weight of R at about 131, and an average y value of 0.8.

The Example III foaming agent was prepared by ethoxylating a linear fatty alcohol, wherein at least 98 percent by weight of the alcohol contained 8 to 10 carbons (i.e., R is from 8 to 10, molecular weight of R is about 131), with ethylene oxide in a mole ratio of 1:0.8 (alcohol to ethylene oxide) and then conventionally sulfating and neutralizing the material to give a final composition with a molecular weight of R at about 131, and an average y value of 0.8.

The Example IV foaming agent was prepared by ethoxylating a mixture of 25 percent by weight of a linear octyl alcohol (molecular weight of R is about 114), 25 percent by weight of a branched ethyl hexanol (molecular weight of R is about 114), and 50 percent by weight of a linear decyl alcohol (molecular weight of R is about 142), with ethylene oxide in a mole ratio of 1:0.8 (alcohol to ethylene oxide) and then conventionally sulfating and neutralizing the material to give a final composition with a molecular weight of R at about 125 and an average y value of 0.8.

The Example V foaming agent was prepared by blending 75 percent by weight of Sample A-1 (identified above) with 25 percent by weight of Sample F-1 (identified above) and then conventionally sulfating and neutralizing the blended materials to give a final composition with a molecular weight of R at about 131, and an average y value of 1.3.

The Example VI foaming agent was prepared by blending 50 percent by weight of the unsulfated ethoxylate of Example III (identified above) and 50 percent by weight of Sample A-1 (identified above) and then conventionally sulfating and neutralizing the blended materials to give a final composition with a molecular weight of R at about 131, and an average y value of 1.3.

The Example VII foaming agent is prepared by ethoxylating a mixture of at least 80 percent by weight of an alcohol containing 8 to 10 carbons (i.e. R is from 8 to 10, molecular weight of R is about 128), up to 20 percent by weight of an alcohol containing 6 carbons or lower (molecular weight of R is about 100 or lower), and up to 10 percent of an alcohol containing 12 carbons or higher (molecular weight of R is about 170 or higher), with ethylene oxide in a molar ratio of 1:0.8 (alcohol to ethylene oxide) and then conventionally sulfating and neutralizing the material to give a final composition with a maximum molecular weight of R at about 169, and an average y value at about 0.8.

SAMPLES A TO F

All the foaming agents that were tested have the general molecular formula (i) so that they can be identified in Table 1 merely by the values of R and y, and the identity of the cation M is ammonium unless otherwise stated.

The Sample A foaming agent (as disclosed by Cukier, U.S. Patent '615) was a commercial foaming agent now marketed by Stepan Canada, Inc. under the trade name Cedepal® FA-406. The molecular weight of R is about 131, and the average value of y is about 2.2.

The Sample B foaming agent was made by blending 50 percent by weight of the unsulfated ethoxylate of Sample H (identified below) and 50 percent by weight of the unsulfated ethoxylate of Example III (identified above) and then conventionally sulfating and neutralizing the blended materials to give a final composition with a molecular weight of R at about 131, and an average y value of 2.2.

The Sample C foaming agent was made by blending 67 percent by weight of the unsulfated ethoxylate of Sample H (identified below) and 33 percent by weight of the unsulfated ethoxylate of Sample F (identified below) and then conventionally sulfating and neutralizing the blended materials to give a final composition with a molecular weight of R at about 131, and an average y value of 2.2.

The Sample D foaming agent (as disclosed by Green, U.S. Patent '515) was prepared by blending 89 percent by weight of a first alkyl ether sulfate with values of R ranging from 8 to 10 (molecular weight of R is about 128) and an average y value of 2.2, with 11 percent by weight of a second alkyl ether sulfate having values of R ranging from 12 to 14 (molecular weight of R is about 180) and an average y value of 1, to give a final composition with a molecular weight of R at least 134, and an average y value of 2.2.

The Sample E foaming agent (as disclosed by Green, U.S. Patent '515) was prepared by blending 75 percent by weight of a first alkyl ether sulfate having values of R ranging from 8 to 10 (molecular weight of R is about 128) and an average y value of 3, with 25 percent by weight of a second alkyl ether sulfate having values of R ranging from 12 to 14 (molecular weight of R is about 180) with an average y value of 3, to give a final composition with a molecular weight of R at about 141, and an average y value of 3.0.

The Sample F foaming agent was prepared by conventionally sulfating and then neutralizing a linear fatty alcohol wherein at least 98 percent by weight of the alcohol contained 8 to 10 carbons (i.e. R is from 8 to 10, molecular weight of R is about 131) to obtain an octyl-decyl alcohol sulfate, with a molecular weight of R at about 131.

The Sample G foaming agent was prepared by ethoxylating a linear fatty alcohol, wherein at least 98 percent by weight of the alcohol contained 8 to 10 carbons (i.e. R is from 8 to 10, molecular weight of R is about 131), with ethylene oxide in a mole ratio of 1:3.5 (alcohol to ethylene oxide) and then conventionally sulfating and neutralizing the material to give a final composition with a molecular weight of R at about 131, and an average y value of 3.5.

The Sample H foaming agent was prepared by ethoxylating a linear fatty alcohol, wherein at least 98 percent by weight of the alcohol contained 8 to 10 carbons (i.e. R is from 8 to 10, molecular weight of R is about 131), with ethylene oxide in a mole ratio of 1:5.0 (alcohol to ethylene oxide) and then conventionally sulfating and neutralizing the material to give a final composition with a molecular weight of R at about 131, and an average y value of 5.0.

THE GYPSUM BLOCK TEST METHOD

Using a method simulating the actual performance of gypsum wallboard, gypsum blocks were made as follows:

1. The foaming agent was diluted with water to obtain a solution having a concentration of about 0.50 percent by weight on a 100 percent by weight active basis wherein the alkyl ether sulfates have the general formula (I), and the letters R and y represent the molecular weight and the average degree of ethoxylation, respectively, as shown in Table 1.
2. The following mixture was then prepared: 10 grams of above solution, 145 grams of water, 200 grams of stucco, and approximately 2 grams of additives normally used in the manufacturing of wallboard, such as binders, accelerators, etc.
3. The above mixture was allowed to stand for 30 seconds and then it was mixed on high speed for 15 seconds in a Hamilton Beach mixer.
4. The resulting slurry was poured into plastic molds and allowed to set. The resultant blocks were then dried to constant weight at about 43° C. for about 48 hours.
5. The performance of the individual foaming agents was measured in terms of present by volume of air entrained in the blocks. This value was obtained via a simple mathematical calculation which considered the weight of the foam containing blocks before and after drying and the density of gypsum.

The percent by volume of air entrained i the gypsum blocks is shown in Table 1, Examples I–VI and Samples A–H.

The performance of the foaming agents can be directly assessed by the percent by volume of air which is entrained in the blocks. According to the Gypsum Block Test, the higher the percent by volume of air entrained in the block, the better the performance of the foamer.

TABLE 1

| Inventive Foaming Agent | Air Entrained (percent by weight) | R (approximate molecular weight) | Y (approximate average value) | Distribution of Oxyethylene Oligomers (percent by weight) | | | | | | |
|---|---|---|---|---|---|---|---|---|---|---|
| | | | | 0 | 1 | 2 | 3 | 4 | 5 | (Sum of 0–5) |
| EXAMPLE I | 25.6 | 131 | 0.4 | 78.9 | 3.5 | 3.6 | 3.5 | 3.0 | 2.2 | (94.7) |
| EXAMPLE II | 26.4 | 131 | 0.8 | 57.8 | 7.0 | 7.1 | 7.0 | 6.0 | 4.4 | (89.3) |
| EXAMPLE III | 26.4 | 131 | 0.8 | 40.5 | 21.7 | 15.2 | 9.7 | 5.4 | 3.0 | (95.5) |
| EXAMPLE IV | 26.4 | 128 | 0.8 | 40.5 | 21.7 | 15.2 | 9.7 | 5.4 | 3.9 | (95.5) |
| EXAMPLE V | 26.1 | 131 | 1.3 | 36.6 | 10.5 | 10.6 | 10.6 | 9.0 | 6.5 | (83.8) |
| EXAMPLE VI | 25.8 | 131 | 1.3 | 27.0 | 17.8 | 14.7 | 11.9 | 8.7 | 5.8 | (85.9) |
| PRIOR ART | | | | | | | | | | |
| SAMPLE A* | 24.4 | 131 | 2.2 | 15.5 | 14.0 | 14.2 | 14.1 | 12.0 | 8.7 | (78.5) |
| SAMPLE B* | 23.8 | 131 | 2.2 | 22.0 | 13.7 | 12.0 | 10.3 | 9.0 | 7.7 | (74.7) |
| SAMPLE C* | 20.9 | 131 | 2.2 | 35.2 | 3.0 | 5.7 | 7.2 | 8.2 | 8.2 | (67.5) |
| SAMPLE D# | 22.5 | 134 | 2.2 | 18.5 | 14.6 | 14.1 | 13.6 | 11.3 | 8.2 | (80.3) |
| SAMPLE E# | 19.9 | 141 | 3.0 | 12.1 | 10.8 | 12.4 | 12.8 | 12.5 | 10.1 | (70.7) |

TABLE 1-continued

| Inventive Foaming Agent | Air Entrained (percent by weight) | R (approximate molecular weight) | Y (approximate average value) | Distribution of Oxyethylene Oligomers (percent by weight) | | | | | | |
|---|---|---|---|---|---|---|---|---|---|---|
| | | | | 0 | 1 | 2 | 3 | 4 | 5 | (Sum of 0–5) |
| COMPARATIVE | | | | | | | | | | |
| SAMPLE F | 23.2 | 131 | 0 | 100 | | | | | | (100) |
| SAMPLE G | 23.0 | 131 | 3.5 | 5.7 | 8.0 | 11.0 | 12.7 | 12.7 | 11.5 | (61.6) |
| SAMPLE H | 20.6 | 131 | 5.0 | 3.4 | 5.8 | 8.7 | 11.0 | 12.5 | 12.5 | (53.9) |

*disclosed by Cukier, U.S. Pat. No. '615
disclosed by Green, U.S. Pat. No. '515

As can be seen from the data in Table 1 the foaming agents disclosed herein yield gypsum blocks having from 25.8 to 26.4 percent air entrained, whereas Cukier's preferred foaming agent (U.S. Patent '615, Sample A) yields a gypsum block having only 24.4 percent air entrained, and the foaming agents disclosed by Green et al., (U.S. Patent '515, Samples D and E) yield gypsum blocks having only from 20.0 to 19.9 percent air entrained. This demonstrates substantial improvement of the foaming agents of this invention. Improvements from 6 to 8 percent over the products made according to the teachings of Cukier (U.S. Patent '615) and 10 to 25 percent over the products made according to the teachings of Green et al. (U.S. Patent '515) are thus attained. It is clear that the alkyl ether sulfates as described in Examples I to VI, having an average value of y ranging from about 0.4 to 1.3, and an oxyethylene oligomeric distribution wherein the alkyl sulfate oligomer is from about 25 to 85 percent by weight of the total oligomeric distribution, and the sum of the alkyl sulfate, alkyl mono-ether sulfate, alkyl di-ether sulfate, alkyl tri-ether sulfate, alkyl tetra-ether sulfate, and alkyl penta-ether sulfate oligomers is from about 80 to 96 percent by weight of the total oligomeric distribution, have substantial improved foaming performance. This point is most evident when the foaming performance of the inventive foaming agents is compared to the foaming performance of Samples F and H. Sample F, which contains no ethylene oxide, only achieves a gypsum block having 23.2 percent air entrained, while Sample H, having an average y value of 5, yields a gypsum block with only 20.6 percent air entrained.

In the practice of the invention, the distribution or ratio of respective oxyethylene oligomers in the foaming agents is also of importance. The distribution of the ethoxy oligomers, which can be readily determined by high performance liquid chromatography (HPLC), is used herein to more accurately describe the composition of the foaming agents. Results of this determination, along with the performance of each foaming agent by the Gypsum Block Test are also set forth in Table 1. As seen in Table 1, the distribution of the oxyethylene oligomers is an important characteristic of the foaming agents. This distribution, from which the average value of y is calculated, appears to affect the intrinsic foaming performance of said foaming agents. This point is clearly demonstrated in Samples A and C. While the average value of y for each of these foaming agents is 2.2, the ethoxy oligomer distribution is different, and thus, the foaming performance is affected. Sample A yields a gypsum block with 24.4 percent air entrained, while in contrast, Sample C yields a block with only 20.9 percent air entrained.

It is clear from the data in Table 1 that best performance, as represented by the volume of foam in the gypsum blocks, is achieved when the alkyl sulfate oligomer is from about 25 to 85 percent by weight of the total oligomeric distribution, and the sum of the alkyl sulfate, alkyl mono-ether sulfate, alkyl di-ether sulfate, alkyl tri-ether sulfate, alkyl tetra-ether sulfate, and alkyl penta-ether sulfate oligomers is from about 80 to 96 percent by weight of the total oligomeric distribution. The foaming agents which fall into these ranges yield gypsum blocks having a greater volume of entrained air.

In summary, three criteria are of importance to produce a foaming agent in accordance with the principals of the invention and which have improved foaming performance in the making of gypsum panels; i.e., the molecular weight of R, the degree of ethoxylation in the foaming agent, and the distribution of the oxyethylene oligomers.

The alkyl group must have from about 8 to 10 carbon atoms (molecular weight of R at about 128) and comprise, most preferably, about 98 percent by weight of the alcohol from which the anionic active ingredient is derived. However, since foaming agents are usually made from industrial grade fatty alcohols of mixed carbon chain lengths, it is from a practical point acceptable to have at least 80 percent by weight, preferably 90 percent by weight and most preferably 98 percent by weight of a first anionic active oligomeric species having a value of R which ranges from about 8 to 10 (molecular weight of R at about 128), with a maximum of 20 percent by weight, preferably 10 percent by weight and most preferably 5 percent by weight of a second anionic active oligomeric species having a value of R at about 6 or lower (molecular weight of R at 100 or lower), and a maximum of 10 percent by weight, preferably 5 percent by weight and most preferably 1 percent by weight of a third anionic active oligomeric species having a value of R at about 12 or higher (molecular weight of R at about 170 or higher). Other carbon chain lengths for which the value of R is greater than 12 (molecular weight of R greater than 170) are detrimental and appear to inhibit the foaming properties. In the presence of gypsum, when y is low (i.e. less than 3), sulfates having a value of R greater than 12 (molecular weight of R greater than 170) may form a water insoluble product, thereby reducing the effectiveness of the foaming agent. This phenomena may predominate as the size of the alkyl moiety increases, and is best determined when the foaming agent is evaluated in the presence of gypsum, i.e., maintaining a saturated solution of gypsum and a constant concentration of free calcium ions. Therefore, the carbon chain lengths for which R has a value from about 12 or above (molecular weight of R at about 170 or higher) should probably constitute no more than about 10 percent by eight, preferably 5 percent by weight and most preferably 1 percent by weight, of the anionic active foaming agent.

The average y value must be from 0.4 to 1.3, as illustrated in Table 1. An average value of y above 1.5 yields an oligomer distribution containing a large percentage of oligomers in which the value of y is greater than 5. This gives a foaming agent which is a less effective gypsum air entrainer.

In each of the following examples, "composition" refers to a solution or suspension of a mixture of foaming agent surfactants in the carrier while "formulation" refers to a solution or suspension of a composition diluted in water.

EXAMPLE 8

1. Foaming Agent/Carrier Composition Containing Glycol as Carrier

A foaming agent carrier composition is prepared by dissolving the foaming agent mixture of Example III in propylene glycol at a total surfactant (active) concentration of about 52% by weight such that the glycol concentration is about 15% by weight. This composition has a flash point of greater than 200° F. Three aqueous foaming agent formulations (water, 15% brine, and saturated-gypsum water) are prepared using 1 g of foaming agent glycol composition and 100 g of water. In each case, the foaming agent glycol composition dissolves with minimum agitation rapidly and completely. A similar composition employing ethanol (foaming agent-ethanol composition) as the carrier dissolves similarly in water.

The foaming agent characteristics, as determined by foam generated in a blender, of these resulting aqueous formulations is at least equivalent to aqueous foaming agent formulations prepared with foaming agent compositions having ethanol as the carrier. The foam half-life of each of the aqueous formulations prepared with the glycol composition is at least equivalent to that obtained with an ethanol based composition.

When containers containing this foaming agent glycol composition and the foaming agent ethanol composition are exposed to the atmosphere for 4 hours, the ethanol composition, but not the glycol composition, begins to thicken and appear gelatinous. An attempt to prepare an aqueous formulation with the exposed ethanol composition requires considerable agitation to obtain solution. The glycol based composition to the contrary, remain clear and fluid after the 4 hour exposure and retains its dissolution characteristics. Failure to obtain rapid and complete dissolution of the foaming agent carrier composition can cause serious processing problems and an unacceptable product when manufacturing gypsum wallboard.

2. Foaming Agent/Carrier Composition Containing Glycol Ether

A foaming agent carrier composition is prepared by dissolving the foaming agent mixture of Example III in dipropylene glycol monomethyl ether at a total surfactant (active) concentration of about 48% by weight such that the glycol ether concentration is about 20% by weight. This composition has a flash point of greater than 200° F. Three aqueous foaming agent formulations (water, 15% brine, and saturated-gypsum water) are prepared using 1 g of foaming agent glycol ether composition and 100 g of water. In each case, the foaming agent glycol ether composition dissolves with minimum agitation rapidly and completely. A similar composition employing ethanol (foaming agent ethanol composition) as the carrier dissolved similarly.

The foaming agent characteristics, as determined by foam generated in a blender, of these resulting aqueous formulations is at least equivalent to aqueous foaming agent formulations prepared with foaming agent compositions having ethanol as the carrier. The foam half-life of each of the aqueous formulations prepared with the glycol ether composition is at least equivalent to that obtained with an ethanol based composition.

When containers containing this foaming agent glycol ether composition and the foaming agent ethanol composition are exposed to the atmosphere for 4 hours, the ethanol composition, but not the glycol ether composition, begins to thicken and appear gelatinous. An attempt to prepare an aqueous formulation with the exposed ethanol composition requires considerable agitation to obtain solution. The glycol ether based composition, to the contrary, remains clear and fluid after the 4 hour exposure and retains its dissolution characteristics.

3. Foaming Agent/Carrier Composition Containing Glycol Ether

A foaming agent carrier composition is prepared by dissolving the foaming agent mixture of Example III in dipropylene glycol monopropyl ether at a total surfactant (active) concentration of about 56% by weight such that the glycol ether concentration is about 13% by weight. This composition has a flash point of greater than 200° F. Three aqueous foaming agent formulations (water, 15% brine, and saturated-gypsum water) are prepared using 1 g of foaming agent glycol ether composition and 100 g of water. In each case, the foaming agent glycol ether composition dissolves with minimum agitation rapidly and completely. A similar composition employing ethanol (foaming agent ethanol composition) as the carrier dissolved similarly.

The foaming agent characteristics, as determined by foam generated in a blender, of these resulting aqueous formulations is at least equivalent to aqueous foaming agent formulations prepared with foaming agent compositions having ethanol as the carrier. The foam half-life of each of the aqueous formulations prepared with the glycol ether composition is at least equivalent to that obtained with an ethanol based composition.

When containers containing this foaming agent glycol ether composition and the foaming agent ethanol composition are exposed to the atmosphere for 4 hours, the ethanol composition, but not the glycol ether composition, begins to thicken and appear gelatinous. An attempt to prepare an aqueous formulation with the exposed ethanol composition requires considerable agitation to obtain solution. The glycol ether based composition, to the contrary, remains clear and fluid after the 4 hour exposure and retains its dissolution characteristics.

As is apparent from the foregoing specification, the invention is susceptible of being embodied with various alterations and modifications which may differ particularly from those that have been described in the preceding specification and description. For this reason it is to be fully understood that all the foregoing is intended to be merely illustrative and is not to be constituted or interpreted as being restrictive or otherwise limiting of the present invention, excepting as it is set forth and defined in the hereto-appended claims.

We claim:

1. A foaming agent alkylene glycol composition comprising
   (a) a glycol species selected from the group consisting of alkylene glycols, alkylene glycol ethers and polyalkylene glycol ethers; and
   (b) a mixture of surfactants of the formula $R_x(OCH_2CH_2)_yOSO_3M$ wherein $R_x$ represents linear and/or branched chain hydrocarbons having an average of x carbon atoms where at least about 80% of x is between about 8 and 10;

y represents the average number of moles of ethylene oxide per mole of hydrocarbon $R_x$ and is between about 0.4 and 1.3;

M represents a cation capable of producing a water-soluble surfactant; and the amount of surfactant in the mixture having y=0 plus y=1 is between about 44 and 85 weight percent of the foaming agent and the amount of surfactant having y=0 is from about 25 to 85 weight percent of the foaming agent.

2. A foaming agent alkylene glycol composition according to claim 1, wherein the alkylene glycol has from 2–8 carbon atoms in a straight or branched chain.

3. A foaming agent alkylene glycol composition according to claim 1, wherein the alkylene glycol ether where has an alkylene portion of from 2–8 carbon atoms in a straight or branched chain and an ether alkyl portion which is a straight or branched chain lower alkyl having 1–6 carbon atoms.

4. A foaming agent alkylene glycol composition according to claim 1, wherein the mixture of surfactants is present in the composition at a total surfactant (active) concentration of about 35–70% by weight.

5. A foaming agent alkylene glycol composition according to claim 4, wherein the glycol species concentration is about 5–25% by weight.

6. A foaming agent alkylene glycol composition according to claim 1, wherein the mixture of surfactants is present in the composition at a total surfactant concentration of about 45–55% by weight.

7. A foaming agent alkylene glycol composition according to claim 6, wherein the glycol species concentration is about 12–20% by weight.

8. A foaming agent composition according to claim 7, where the glycol species is propylene glycol.

9. A foaming agent composition according to claim 7, where the glycol species is dipropylene glycol monomethyl ether.

10. A foaming agent composition according to claim 7, where the glycol species is dipropylene glycol monopropyl ether.

11. An aqueous foaming agent formulation comprising 0.1% to about 5% by weight of the composition of claim 1.

12. A foaming agent composition according to claim 1, wherein M is selected from the group consisting of sodium, potassium, magnesium, ammonium, quaternary ammonium and mixtures thereof.

13. A foaming agent composition according to claim 1, wherein Y is between about 0.4 and 1.

14. A foaming agent composition according to claim 1, wherein y is between about 0.7 and 0.9.

15. A foaming agent composition according to claim 14, wherein at least about 90 percent of x is between about 8 and 10.

16. A foaming agent composition according to claim 15, wherein about 0 to 20 percent of x is not greater than about 6.

17. A foaming agent according to claim 16, wherein about 0.1 to 10 percent of x is not less than about 12.

18. A foaming agent according to claim 17, wherein y is about 0.8.

19. A foaming agent alkylene glycol composition comprising (a) a glycol species selected from the group consisting of alkylene glycols, alkylene glycol ethers and polyalkylene glycol ethers; and (b) a mixture of surfactants of the formula $$R_x(OCH_2CH_2)_yOSO_3M$$

wherein $R_x$ represents linear and/or branched chain hydrocarbons having an average of x carbon atoms where between at least about 90% of x is between about 8 and 10;

y represents the average number of moles of ethylene oxide per mole of hydrocarbon $R_x$ and is about 0.8;

M represents a cation capable of producing a water-soluble surfactant; and the amount of surfactant in the mixture having y=0 is about 37–43%.

20. A foaming agent according to claim 19, wherein the amount of surfactant in the mixture having y=1 is about 20–25%, the amount of surfactant in the mixture having y=2 is about 13–18%, the amount of surfactant in the mixture having y=3 is about 7–13%, the amount of surfactant in the mixture having y=4 is about 2–7%, and the amount of surfactant in the mixture having y=5 is about 1–4%.

* * * * *